Feb. 15, 1944.   J. T. MARVIN   2,341,732
METHOD AND APPARATUS FOR BRIQUETTING OF POWDERED METAL
Filed April 4, 1941   3 Sheets-Sheet 1

INVENTOR
John T. Marvin
BY
his ATTORNEYS

Feb. 15, 1944.                J. T. MARVIN                 2,341,732
           METHOD AND APPARATUS FOR BRIQUETTING OF POWDERED METAL
                    Filed April 4, 1941        3 Sheets-Sheet 2

INVENTOR
John T. Marvin
BY
His ATTORNEYS

Feb. 15, 1944.  J. T. MARVIN  2,341,732
METHOD AND APPARATUS FOR BRIQUETTING OF POWDERED METAL
Filed April 4, 1941  3 Sheets-Sheet 3
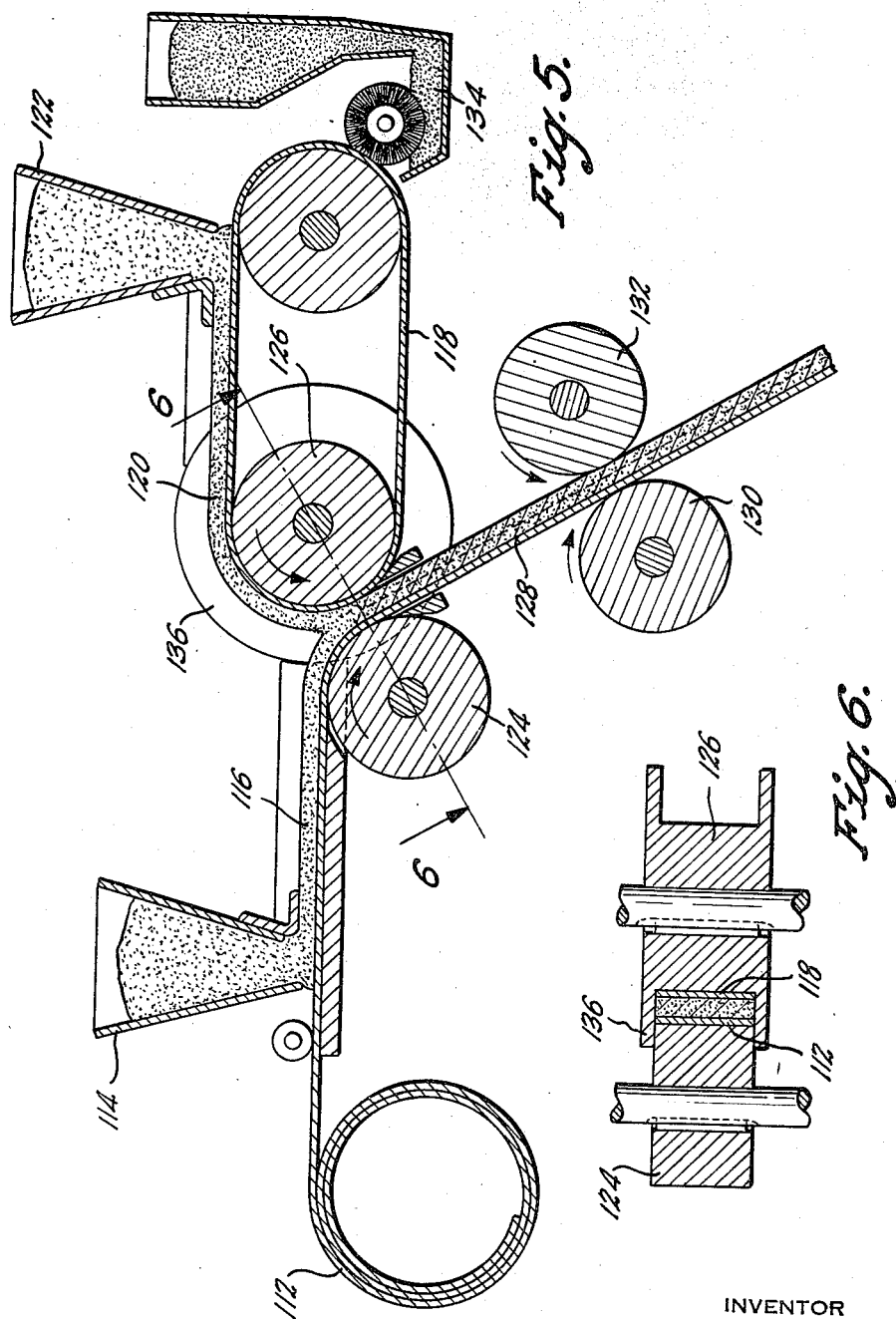
INVENTOR
John T. Marvin
BY
his ATTORNEYS Patented Feb. 15, 1944

2,341,732

UNITED STATES PATENT OFFICE 2,341,732

METHOD AND APPARATUS FOR BRIQUETTING OF POWDERED METAL

John T. Marvin, Dayton, Ohio, assignor to General Motors Corporation, Detroit, Mich., a corporation of Delaware Application April 4, 1941, Serial No. 386,932

8 Claims. (Cl. 75—22)

This invention relates to method and apparatus for the manufacture of porous metal sheets and the like and is particularly concerned with the continuous manufacture of long lengths of porous metallic strip material.

An object of the invention is to provide a method and apparatus for continuously forming porous strip material wherein the density and composition of the porous metal layer is substantially uniform throughout its length.

A further object of this invention is to provide a method and apparatus for forming a composite strip material wherein two layers of different constituency of porous metal can be fabricated continuously and wherein the strip material is of substantially uniform density throughout.

A still further object of the invention is to provide a method and apparatus for continuously forming composite strip material which includes two or more layers of porous metal of different constituency which are bonded together and which are bonded to a steel supporting strip.

Further objects and advantages of the present invention will be apparent from the following description, reference being had to the accompanying drawings wherein preferred embodiments of the present invention are clearly shown.

In the drawings:

Fig. 5 shows an apparatus for continuously briquetting a composite layer of powdered metal onto a steel support strip; and Fig. 6 is a view taken on the line 6—6 of Fig. 5.

Figures 1, 2:
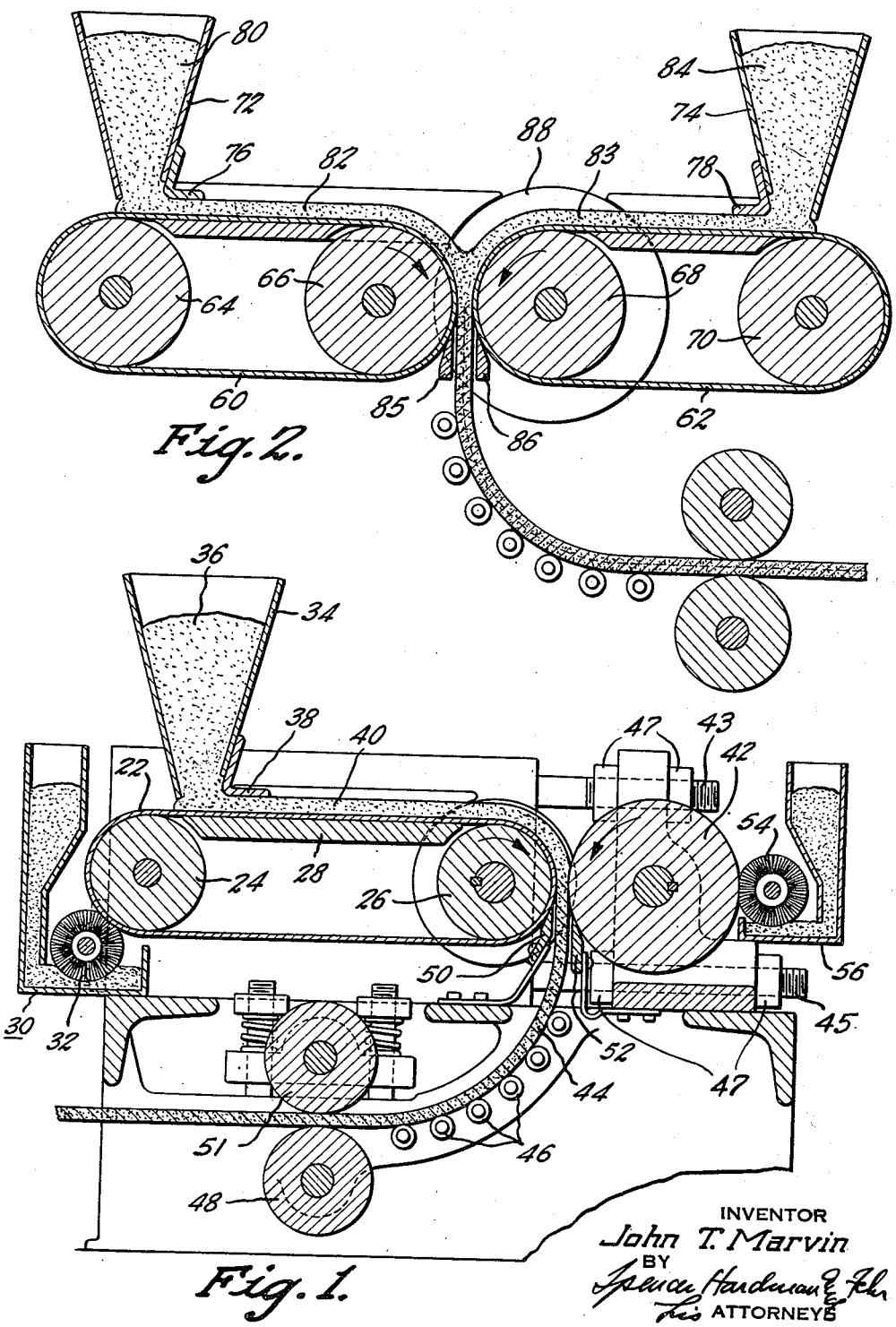
Fig. 1 shows an apparatus for continuously briquetting a strip of porous metallic material.
Fig. 2 is another form of apparatus wherein a composite porous metal strip may be formed.

Referring particularly to Fig. 1, an apparatus is shown for briquetting powdered metal continuously into a strip of self sustained porous metal which may subsequently be sintered in a sintering furnace to form a strong porous strip which may be cut into lengths and formed into desired shapes or may be subsequently bonded to steel or other supporting metal backing material. The apparatus shown in Fig. 1 comprises an endless belt 22 which rotates around a pair of rolls 24 and 26. The belt 22 is preferably metallic such as steel and is supported at the upper side thereof by a supporting plate 28. A dusting device 30 having a revolving brush 32 therein continuously cleans the surface of the belt as it passes the revolving brush 32 and dusts the belt with graphite or some other material which prevents adherence of the powdered metal to the belt. At the upper side of the belt a hopper 34 is provided which is filled with powdered metal 36 which powdered metal feeds by gravity onto the surface of the belt 22. A smoothing device 38, which is adjustable for varying the thickness of the powdered metal layers, smooths out the powdered metal into a layer 40 of a predetermined substantially uniform thickness. This layer is carried by the belt 22 over the roll 26 and is compressed between the belt 22, roll 26 and the opposing roll 42 which is adjustably mounted to provide the desired thickness of the briquetted metal layer. The powdered metal on passing between the opposed rollers 26 and 42 is compressed into a self-adhering mass or strip 44 which emerges from the lower portion of the apparatus and is supported upon suitable rollers 46. A second compression step may be accomplished by means of roller 48 and resiliently mounted roll 50 if desired although this step is optional. To assure that the briquetted material does not adhere to the rolls, a pair of scrapers 51 and 52 is provided which bear against the rolls and removes the compressed metal strip, if necessary. The roll 42 is dusted by means of a brush 54 operating in a dust box 56 in a similar manner to the dusting already explained with respect to the belt 22. In this manner, the scrapers 50 and 52 seldom come into actual operation but are placed in position to prevent any powdered metal in the compressed condition from sticking to the roll or belt and possibly causing difficulty on the next passage of the belt between the rolls.

The rolls 26 and 42 are driven in opposite directions at a similar speed and uniformly compress the metal powder in a self-sustaining sheet or strip that has a substantially uniform density throughout. The uniformity of density is contributed to by the uniform layer of powdered metal 40 which is fed between the rolls; since a definite quantity of powdered metal is spread out on belt 22 it is apparent that the uniformity of the layer will be constant as it is being compressed.

The compressed strip of powdered metal 44 after leaving the apparatus may be passed continuously into a suitable sintering furnace and sintered under non-oxidizing conditions. If the layer is to be of bronze it is preferable to feed a mixture of copper and tin powders into hopper 34 and to sinter the strip so formed at a temperature from 1500 to 1700° F. under non-oxidizing conditions. In some cases it may be desirable to prealloy the copper and tin to a certain extent. Likewise, copper-nickel, iron-copper, iron-aluminum, iron and ferro-phosphorus or other mixtures of powdered materials may be used. In each case, it being preferable to sinter intermediate the melting points of two component metals.

It is important to prevent vibration in this apparatus since it is apparent that if a mixture of metal powder of different densities is to be used or of different size particles that such vibration will cause a segregation thereby preventing uniformity of constituency throughout the layers.

Fig. 2 shows another type of apparatus wherein a composite porous briquetted metal layer may be formed. In this instance a pair of endless belts 60 and 62 revolving on rollers 64, 66, 68 and 70 is provided, with belts 60 and 62 moving in opposed directions. The belts may be suitably dusted with graphite or other material as previously explained and metal powder may be fed thereon from hoppers 72 and 74 respectively which hoppers include the usual smoothing devices 76 and 78. Powdered metal 80 in hopper 72 is spread into a uniform layer 82 on belt 60 whereas powdered metal 84 in hopper 74 is spread out into a uniform layer 83 on belt 62. Since the belts rotate in opposed directions the two layers 82 and 83 are brought together therebetween and are compressed in a composite metal layer which is rich in the metal component of powder 80 on one side thereof and rich in the metal component of powder 82 on the other side thereof. Suitable scraping devices 85 and 86 are provided for the purpose hereindescribed.

In the apparatus shown in Fig. 2 it is possible to briquette a layer having different porosity at either side thereof. For example, the powder 80 may have a mesh size of from 100 to 150 mesh, whereas powder 84 may have a mesh size of from 200 to 300 mesh. In this manner, a coarse pored layer will be apparent on one side of the strip while a fine pored layer will be apparent on the other side of the strip. Similarly, if different metals are desired preallowed copper tin may be used in one layer wherein the composition is for example 95 copper to 5% tin, whereas prealloyed copper-tin powder in the other layer may have a formula of 90% copper to 10% tin. Likewise any other constituency of metallic components may be utilized providing sintering may be accomplished at a common sintering temperature, such limitations being readily observed by study of the melting points of the components. The roll 68 is preferably flanged as at 88, which roll fits closely against the side of roll 66 and prevents metal powder from dropping off the belts. Likewise the other side of roll 68 is flanged in a similar manner.

Figures 3, 4:
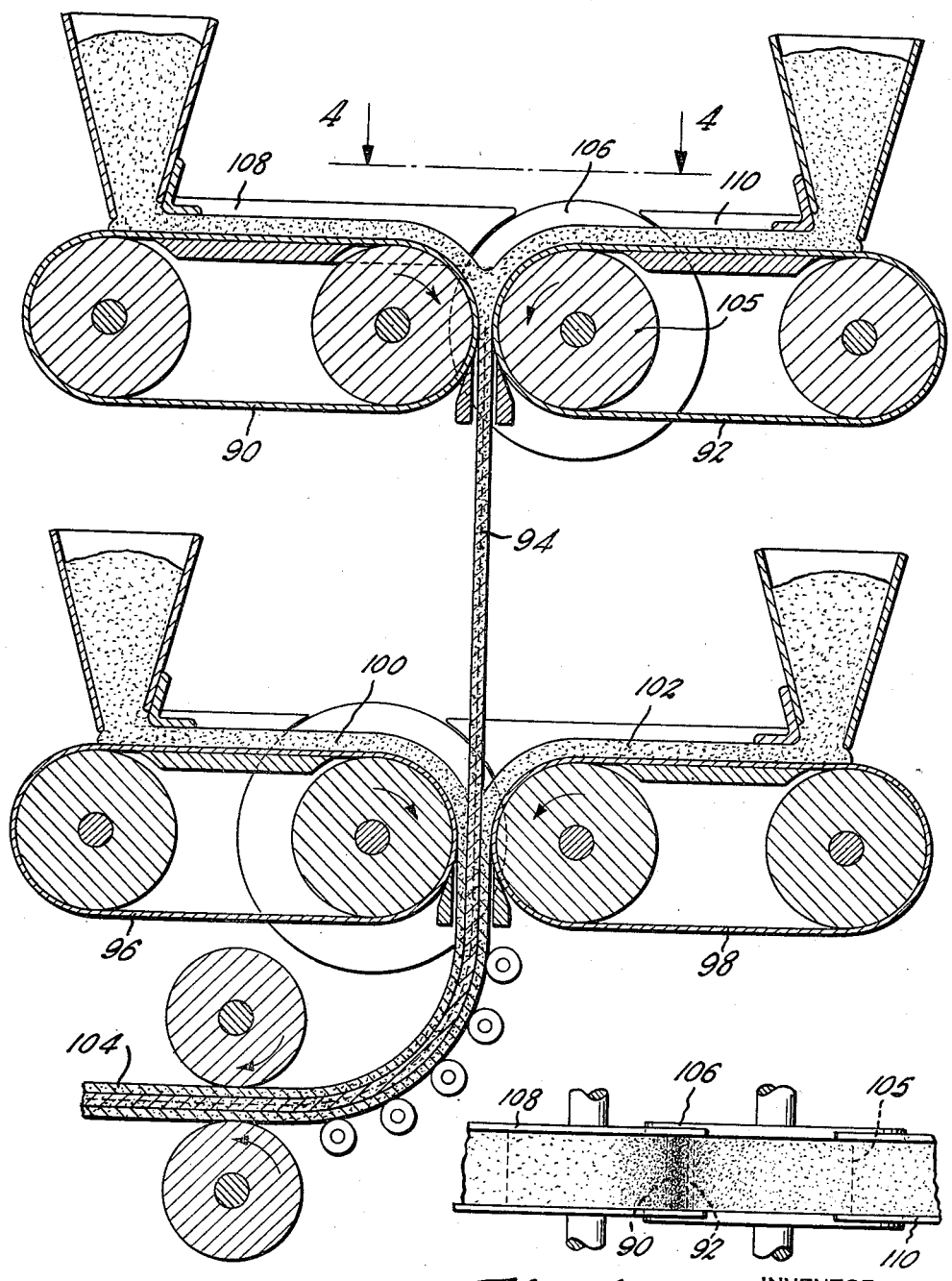
Fig. 3 is still another type of apparatus wherein a strip having four layers of different material may be formed.
Fig. 4 is a view taken on the line 4—4 of Fig. 3.

Fig. 3 shows still another type of apparatus wherein two pairs of endless belts are used. In this instance the upper pairs of belts 90 and 92 are utilized to form a composite strip of compressed powdered metal 94 which is fed directly between the lower sets of belts 96 and 98. The lower belts 96 and 98 carry powdered metal layers 100 and 102 thereon which layers are briquetted on the opposed sides of strip 94. Thus strip 104 has four layers of different materials either as to composition or physical characteristics therein. Fig. 4 shows the interlocking effect of the flange 106 used in connection with roll 105 and belt 92. This flange on the roll, as previously mentioned, prevents the metal powder from dropping off the belts and is used in connection with all of the embodiments. Likewise the side rails 108 and 110 which extend longitudinally of the belts are used in all of the embodiments to prevent the metal powder from dropping therefrom.

Fig. 5 shows still another type of apparatus wherein a composite metal strip may be formed which includes a briquetted powdered metal layer adhering to a steel supporting surface. In this instance, steel strip 112 is provided from a reel. The strip passes beneath hopper 114 and has a layer of powdered metal 116 uniformly spread thereon. An endless belt 118 is disposed so that a powdered metal layer 120 is fed from hopper 122 and is superimposed on the powdered metal layer 116 on steel strip 112 as the strip and the powdered metal layers pass between the opposed rolls 124 and 126. In this manner, a composite strip 128 is provided which includes a steel supporting element having thereon a composite compressed metal layer which may vary either in density or constituency as desired. The strip with the compressed powder metal layer thereon may pass between a pair of compression rolls 130 and 132 if desired for further operation thereon. In this instance, as in all of the other embodiments, a dusting device 134 is preferably utilized in connection with the endless belt 118. Fig. 6 shows the flanged roll 126 with its interlocking flanges 136 thereon, in connection with roll 124 and steel strip 112.

In all of the embodiments scrapers may be utilized if necessary and belts may be cleaned and dusted with suitable material to prevent adherence of the powdered metal thereon. Likewise in each case compression steps may be provided after formation of the briquetted strip material prior to the passage of the strip into a sintering furnace or, if desired, the strip may be further compressed within the furnace during the heating thereof or after emerging from the furnace, such alternative steps being well known in the art.

In each and every case it is also to be understood that the endless belts and mechanisms are adjustable (for example, on screws 43 and 45 as shown in Fig. 1 wherein the roll 42 is movable relative to the compacting surface of the belt) so as to provide any desired pressure therebetween for briquetting the powdered metal layers although care should be taken that briquetting is accomplished without building up metal powder at the tangential portions of the endless belts. Thus the maximum pressures which may be applied are best arrived at by trial.

It is apparent that I have provided a simple, inexpensive apparatus and method for making composite briquetted metal layers which may be subsequently sintered into porous metal strips. The method and apparatus eliminate segregation of powdered metal either due to the mass of particles or the difference of density therebetween since the apparatus is devoid of vibratory motion which would cause segregation. This is extremely important since it is impossible to form composite strips including a plurality of layers of different densities or different materials if any vibration is apparent due to the physical characteristics of the powder which segregates easily when vibrated.

While the embodiment of the present invention as herein disclosed, constitute preferred forms, it is to be understood that other forms might be adopted, all coming within the scope of the claims which follow.

What is claimed is as follows:

1. In a method for continuously making a composite porous metal layer, the steps comprising; uniformly spreading a loose non-compacted layer of metal powder upon opposed endless belt conveyors, conveying said layers in opposite directions, compacting said layers between said belts whereby a composite briquetted layer is continuously formed which is self sustaining, and then passing said composite layer of compressed powder metal through a sintering furnace under suitable conditions for causing the layers to sinter together into a composite porous metal layer.

2. The steps in the method of continuously making composite strip material, comprising; uniformly distributing a layer of non-compacted metal powder upon the surface of a conveyor, uniformly distributing a second layer of a different metal powder in a non-compacted condition upon the surface of a second conveyor moving in the opposite direction of said first conveyor, bringing said two non-compacted layers of powder together between said conveyors and applying pressure thereto for causing self adherence of the metal powder layers to form a composite strip, and then sintering the composite strip so formed under conditions suitable for forming a porous strip of good strength.

3. The steps in the method of continuously making composite strip material comprising; continuously forming a self sustaining strip of briquetted metal powder, uniformly distributing a layer of metal powder upon the surface of an endless conveyor, uniformly distributing a second layer of metal powder upon the surface of the second conveyor passing the strip of the briquetted powder between said conveyors and simultaneously compressing said two layers of metal powder upon opposite sides of said strip as the stip passes between said conveyors for forming a composite strip of briquetted material, and then sintering the strip so formed under suitable conditions for causing the strip to form a composite porous metal strip.

4. The steps in the method of making composite material comprising; uniformly distributing loose non-compacted metal powder upon the surface of a steel supporting strip or the like, uniformly distributing a loose-non-compacted layer of metal powder upon the surface of an endless conveyor, superimposing the second layer of metal powder upon said first layer of metal powder with the application of pressure for forming a briquetted composite metal layer upon said steel strip, and then sintering the strip with the composite layer thereon under conditions suitable for forming a porous metal composite layer which is bonded to the strip.

5. The steps in the method of continuously making composite metallic strip material comprising, providing two uniform layers of non-compacted metal powder superimposing and simultaneously compacting said layers under pressures sufficient to cause the layers to become self sustaining for forming a composite strip, and then sintering said compacted strip under suitable conditions for forming a composite porous strip having at least two strata therein.

6. The method as claimed in claim 1 together with the added step of dusting the conveyors prior to the application of the powder thereto with a material which prevents adherence of the metal powder to the conveyors during the compacting step.

7. An apparatus for forming porous strip material from metal powders capable of coherence by means of pressure only to form a self-sustaining strip, comprising in combination; an endless metallic conveyor belt carried by two spaced rolls, actuating means for causing said belt and rolls to rotate in one direction, distributing means for distributing a predetermined quantity of powdered metal on the surface of said belt in a layer of substantially uniform thickness, dusting means including a rotating brush positioned ahead of said distributing means for cleaning the surface of said belt and for dusting the surface thereof with a suitable material for preventing adherence of the powdered metal thereto, a pressure roll cooperating with the belt and adjustably mounted with respect thereto, said roll being rotatable in the opposite direction and positioned at a point where the powdered material is leaving the belt for compressing the powdered material between the belt and said pressure roll to any desired degree whereby a self-sustaining strip of compressed metal powder is continuously formed, a second dusting means associated with said pressure roll, support means for supporting the compressed powdered metal strip after it leaves said belt and a pair of cooperating pressure rollers spaced from said belt for further compressing said strip.

8. The steps in the method of continuously making a composite strip of bearing material comprising, continuously providing a strong non-porous conveying strip, continuously supplying a uniform layer of non-compacted metal powder to the surface of said strip, continuously providing a second layer of non-compacted metal powder upon a conveyor, removing said second layer from said conveyor and concomitantly superimposing the second layer upon the first layer while the first layer is carried by said strip and substantially simultaneously compacting the first and second layers upon said strip under pressure sufficient to cause the metal powder to cohere for continuously forming a composite metal strip and then sintering said composite strip under suitable conditions of time, temperature and atmosphere for causing the metal powder layers to sinter into a composite porous metal strip.

JOHN T. MARTIN.